United States Patent
Hayashi et al.

(10) Patent No.: US 7,064,815 B2
(45) Date of Patent: Jun. 20, 2006

(54) METHOD AND APPARATUS FOR MEASURING CHROMATIC DISPERSION

(75) Inventors: Michiaki Hayashi, Kamifukuoka (JP); Hideaki Tanaka, Kamifukuoka (JP)

(73) Assignee: KDDI Corporation, Tokyo (JP)

( * ) Notice: Subject to any disclaimer, the term of this patent is extended or adjusted under 35 U.S.C. 154(b) by 0 days.

(21) Appl. No.: 10/997,738

(22) Filed: Nov. 23, 2004

(65) Prior Publication Data
US 2005/0110981 A1     May 26, 2005

(30) Foreign Application Priority Data
Nov. 26, 2003    (JP)   ............................ 2003-394996

(51) Int. Cl.
*G01N 21/00*      (2006.01)

(52) U.S. Cl. .................................................. 356/73.1
(58) Field of Classification Search ................... None
See application file for complete search history.

(56) References Cited

U.S. PATENT DOCUMENTS

| | | | |
|---|---|---|---|
| 4,752,125 A * | 6/1988 | Schicketanz et al. ...... | 356/73.1 |
| 6,429,929 B1 * | 8/2002 | Babin et al. ............... | 356/73.1 |
| 2003/0123884 A1 * | 7/2003 | Willner et al. ............. | 398/212 |

OTHER PUBLICATIONS

Sano, et al., "Automatic dispersion equalization by monitoring extracted-clock power level in a 40-Gbit/s, 200-km transmission line," TuD.3.5, 22nd European Conference on Optical Communication (ECOC'96) vol. 2, pp. 207-210, Oslo.

Petersen, et al., "Dispersion monitoring and compensation using a single in-band subcarrier tone," WH4-1-3, OFC 2001.

Yu, et al., "Chromatic Dispersion Monitoring Technique Using Sideband Optical Filtering and Clock Phase-Shift Detection," Journal of Lightwave Technology, vol. 20, No. 12, Dec. 2002, pp. 2267-2271.

* cited by examiner

*Primary Examiner*—Tu T. Nguyen
(74) *Attorney, Agent, or Firm*—Christie, Parker and Hale, LLP

(57) ABSTRACT

A test signal light intensity-modulated with a test data is generated and enters the optical transmission line. An extractor extracts the first and second optical components from the test signal light output from the optical transmission line, the first and second optical components composed of any one of a main signal light component, an upper sideband component, and/or a lower sideband component. A time difference measuring apparatus measures a time difference between the first and second optical components. A converter converts the measured time difference into a chromatic dispersion value.

16 Claims, 7 Drawing Sheets

METHOD AND APPARATUS FOR MEASURING CHROMATIC DISPERSION

CROSS REFERENCE TO RELATED APPLICATIONS

This application claims priority to Japanese Patent Application No. 2003-394996, filed Nov. 26, 2003, the entire contents of which are incorporated herein by reference.

FIELD OF THE INVENTION

This invention relates to method and apparatus for measuring chromatic dispersion.

BACKGROUND OF THE INVENTION

In an optical fiber transmission system, an influence of chromatic dispersion in an optical fiber transmission line is inevitable. Accordingly, means to measure an amount of chromatic dispersion in an optical transmission line are demanded. Well-known means are disclosed in the following three references: (1) A. Sano et al., "Automatic dispersion equalization by monitoring extracted-clock power level in a 40-Gbit/s, 200-km transmission line," Tu3.5, Vol. 2, pp. 207–210, ECOC'96; (2) M. N. Peterson et al., "Dispersion monitoring and compensation using single in-band Subcarrier tone," WH4, OFC2001; and (3) Q. Yu et al., "Chromatic Dispersion Monitoring Technique Using Sideband Optical Filtering and Clock Phase-Shift Detection," Journal of lightwave Technology, Vol. 20, No. 12, pp. 2267–2271, 2002.

In the first method described in the above reference (1), an optical signal is converted into an electric signal, and from the electric signal, electrospectral intensity to be affected by chromatic dispersion is detected. The electrospectral intensity decreases according to an increase of an amount of chromatic dispersion in an optical transmission line. This method estimates an amount of chromatic dispersion in an optical transmission line using such relation between the electrospectral intensity and the amount of chromatic dispersion.

In the second method described in the second reference (2), an optical transmitter transmits to an optical transmission line an optical signal superimposed by a tone signal of frequency f (Hz). In an optical receiver, the optical signal from the optical transmission line is converted into an electric signal, and a component of the tone frequency f (Hz) is extracted from the electric signal. Amplitude of the component of the tone frequency detected in the optical receiver decreases according to an increase of an amount of chromatic dispersion in the optical transmission line. The amount of chromatic dispersion of the optical transmission line is estimated using such relation.

In the third method described in the third reference (3), an optical transmitter generates and transmits to an optical transmission line an optical signal intensity-modulated by a test data (e.g. random data). In an optical receiver, a sideband component on the long wavelength side, that is a lower sideband component, and a sideband component on the short wavelength side, that is an upper sideband component, of intensity modulation are extracted from the optical signal input from the optical transmission line. Each sideband component is converted into an electric signal to extract a clock component. Phases of the two clock components are compared. This method uses such mechanism that a phase difference between two clocks depends on detuning amounts of two filters for extracting sidebands and on chromatic dispersion of a signal wavelength.

Measured results of the above-stated first and second conventional methods are, however, affected by factors other than the amount of chromatic dispersion, such as polarization mode dispersion (PMD) and an optical signal to noise ratio (OSNR) and therefore it is difficult to obtain an accurate amount of chromatic dispersion. Furthermore, in a configuration in which a PMD compensator is added, it is difficult to automatize the measurement of the amount of chromatic dispersion.

In the second conventional method, since it is necessary to dispose additional apparatuses on both transmitter and receiver sides, there is a disadvantage that the configurations of an optical transmitter and an optical receiver become complicated.

Although the third conventional method has an advantage of low dependency on PMD and OSNR, it is necessary to dispose two high-speed optoelectric converters, two clock extractors, and a phase comparator to compare a phase of outputs from the two clock extractors and accordingly the configuration becomes expensive and large-sized.

SUMMARY OF THE INVENTION

One exemplary embodiment of the invention provides a chromatic method to measure a chromatic dispersion in an optical transmission line. The method includes generating a test signal light intensity-modulated with a test data; inputting the generated test signal light into the optical transmission line; extracting first and second optical components from the optical transmission line, each of the first and second component comprising a main signal light component of the test signal light, an upper sideband component of the test signal light, or a lower sideband component of the test signal light; measuring a time difference between the first and second optical components; and converting the measured time difference into the chromatic dispersion.

Preferably, the measuring a time difference between the first and second optical components comprises delaying the second optical component and calculating a correlation between the first optical component and the delayed second optical component while varying a phase difference between the first and second optical components.

Preferably, the measuring a time difference between the first and second optical components is performed through varying the phase difference between the first and second optical components in a sawtooth waveform.

Preferably, the measuring a time difference between the first and second optical components is performed in each of increasing and decreasing directions of the phase difference while varying the phase difference between the first and second optical components in a triangle waveform.

Preferably, the measuring a time difference between the first and second optical components includes giving a constant delay to one portion of the first and second optical components, giving a variable delay to another portion of the first and second optical components, calculating a correlation between the first and second optical components delayed respectively with the constant delay and the variable delay, and detecting a delay time at the giving of the variable delay that brings a maximum correlation in the correlations that can be calculated by the calculating of the correlation.

Preferably, the first optical component includes one portion of the upper and lower sideband components of the test signal light, and the second optical component includes another portion of the upper and lower sideband components of the test signal light.

Preferably, the first optical component includes the main signal light component of the test signal light, and the second optical component includes one of upper and lower sideband components of the test signal light.

Preferably the delay time at the giving of the variable delay varies in a sawtooth waveform.

Preferably, the delay time at the giving of the variable delay varies in a triangle waveform, and the detecting of the delay time detects a delay time that brings a maximum correlation in the correlations that can be calculated by the calculating of the correlation in each of increasing and decreasing directions of the variable delay time.

One exemplary embodiment of the invention provides an apparatus to measure a chromatic dispersion in an optical transmission line is provided. The apparatus includes an extractor to extract first and second optical components from a test signal light input from the optical transmission line, each of the first and second optical components comprising a main signal light component of the test signal light, an upper sideband component of the test signal light, or a lower sideband component of the test signal light; a time difference measuring apparatus to measure a time difference between the first and second optical components; and a converter to convert the measured time difference into the chromatic dispersion value.

Preferably, the time difference measuring apparatus includes a constant delay device to give a constant delay to one portion of the first and second optical components; a variable delay device to give a variable delay to another portion of the first and second optical components, an optical correlator to calculate a correlation between the first and second optical components delayed respectively by the constant delay device and the variable delay device, and a delay detector to detect a delay time of the variable delay device that brings a maximum correlation in the correlations that can be calculated by the optical correlator.

Preferably, the optical correlator includes an electroabsorption optical modulator, an optical circulator, and an optical filter to extract one portion of wavelength components of the first and second optical components, wherein one portion of optical outputs from the constant delay device and the variable delay device directly enters the electroabsorption optical modulator and another portion of the optical outputs from the constant delay device and the variable delay device enters the electroabsorption optical modulator via the optical circulator.

Preferably, the optical correlator includes an electroabsorption optical modulator to which optical outputs from the constant delay device and the variable delay device enter and an optical filter to extract one the wavelength components of the first and second optical components from an output (or an optical output) from the electroabsorption optical modulator.

Preferably, the delay detector includes a photoelectric converter to convert a correlation signal light output from the optical correlator into an electric signal, a peak detector to detect a peak of the electric signal from the photoelectric converter, and a timer to start timekeeping synchronizing with a variation of delay time of the variable delay device and to stop the timekeeping according to peak detection of the peak detector.

Preferably, the variable delay device includes a variable delay line that can be driven in a sawtooth waveform.

Preferably, the variable delay device includes a variable delay line that can be driven in a triangle waveform and the delay detector detects a delay time of the variable delay line that brings the maximum correlation in correlations that can be calculated by the optical correlator in each of increasing and decreasing directions of the delay time of the variable delay line.

Preferably, the first optical component includes one portion of the upper and lower sideband components of the test signal light and the second optical component includes another portion of the upper and lower sideband components of the test signal light.

Preferably, the first optical component includes the main signal light component of the test signal light and the second optical component can includes one of upper and lower sideband components of the test signal light.

According to exemplary embodiments of the invention, since main parts are configured with optical elements, it is possible to measure chromatic dispersion without using a high-speed electric circuit. In addition, chromatic dispersion can be measured in a wide range and also a polarity of chromatic dispersion can be judged.

BRIEF DESCRIPTION OF THE DRAWINGS

The above and other objects, features and advantages of the present invention will be apparent from the following detailed description of explanatory embodiments of the invention in conjunction with the accompanying drawings, in which.

DETAILED DESCRIPTION

Explanatory embodiments of the invention are explained below in detail with reference to the drawings.

Figure 1:
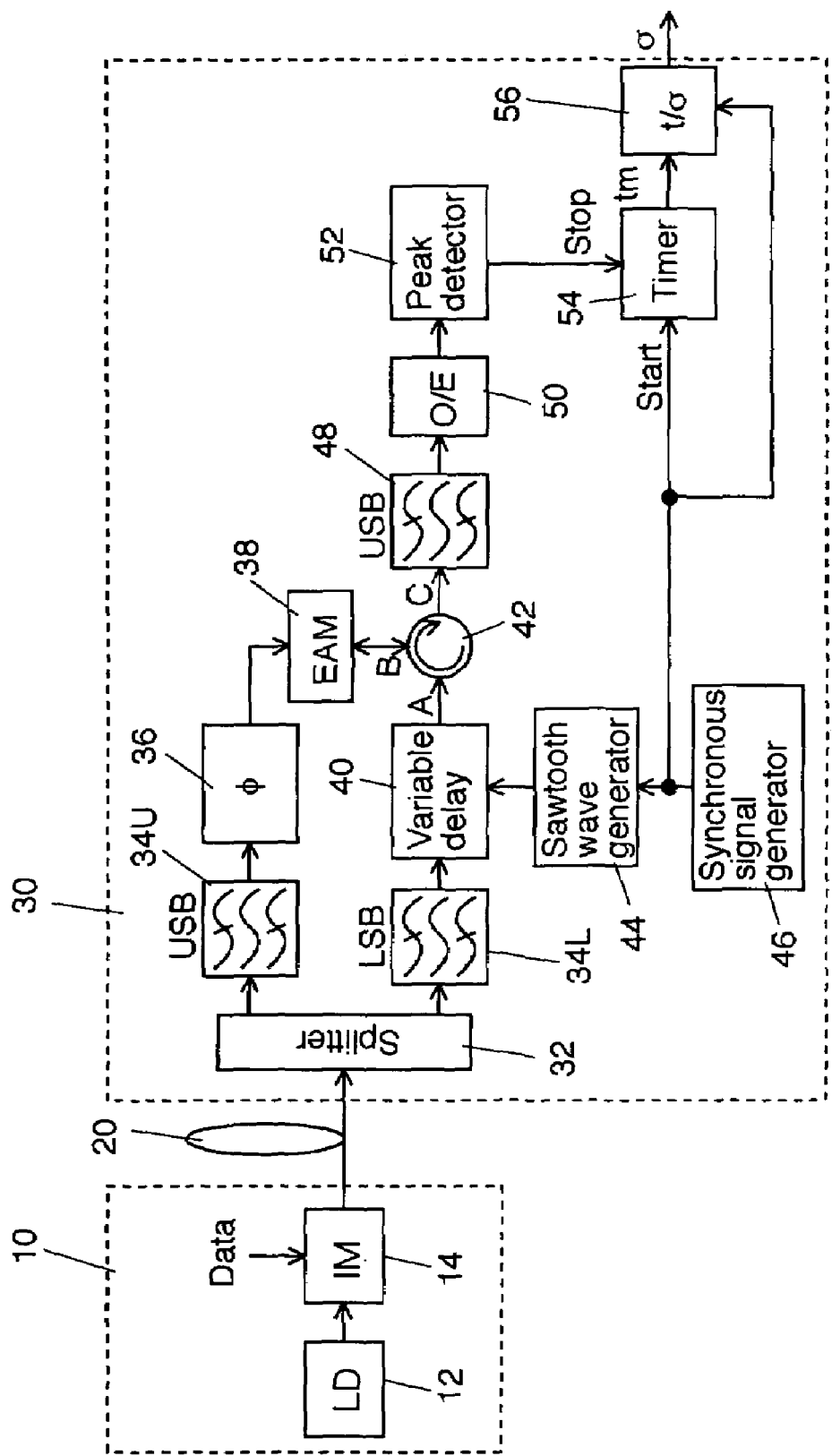
FIG. 1 is a schematic block diagram of a first explanatory embodiment according to the invention.
Figure 2:
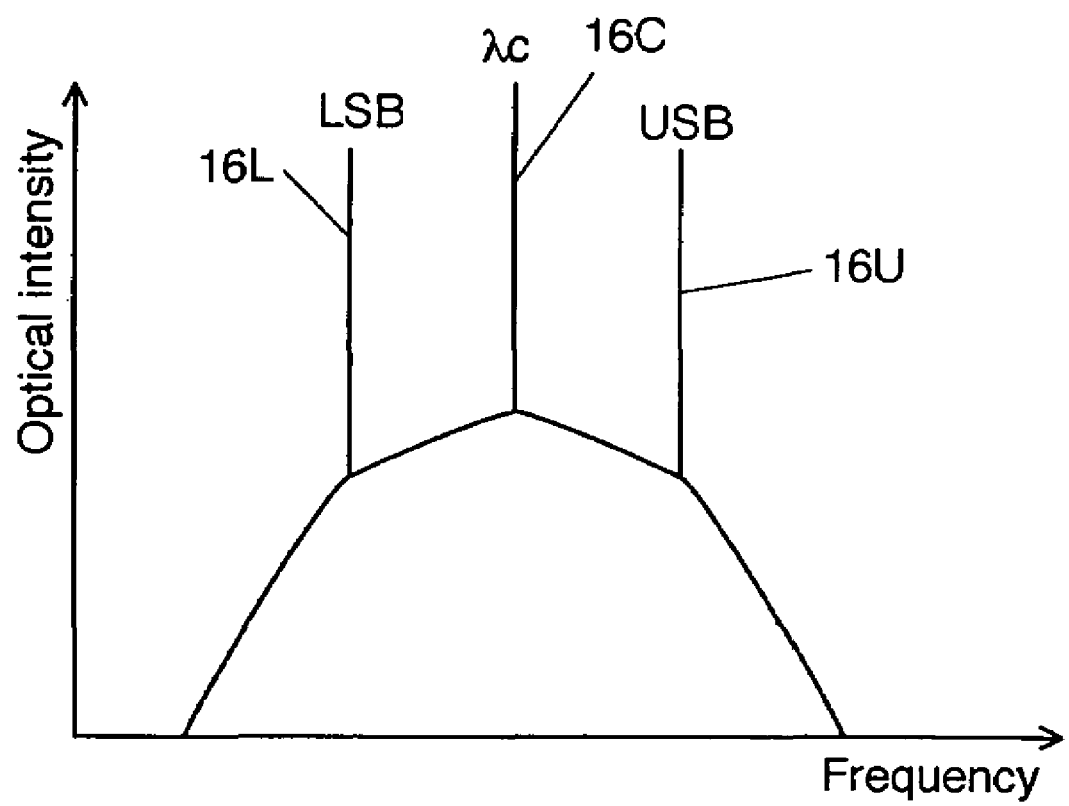
FIG. 2 shows a spectral example of test signal light in the first explanatory embodiment.

FIG. 1 shows a schematic block diagram of a first explanatory embodiment according to the invention. A test signal light generator 10 includes a laser light source 12 of a wavelength λc and an intensity modulator 14 to intensity-modulate an optical output from the laser light source 12 with a data. The intensity-modulated signal light from the intensity modulator 14 is input to an optical transmission line 20 as a test signal light. FIG. 2 shows a spectral example of the intensity-modulated signal light to be input to the optical transmission line 20. The horizontal axis expresses frequency and the vertical axis expresses optical intensity. A peak 16C in the center shows an optical carrier of the wavelength λc, a peak 16U on the high frequency side shows an upper side band (USB), and a peak 16L on the low frequency side shows a lower sideband (LSB).

In this first explanatory embodiment, the data is a dummy data only used for measuring chromatic dispersion in the optical transmission line 20. It is also possible to use a data for communication. The wavelength λc of a laser light output from the laser light source 12 is a wavelength, at which a chromatic dispersion in the optical transmission line 20 is measured.

The test signal light (intensity modulated signal light) propagated in the optical transmission line 20 enters a chromatic dispersion measuring apparatus 30. The chromatic dispersion measuring apparatus 30 is generally disposed in an optical receiving terminal.

A splitter 32 splits the test signal light from the optical transmission line 20 into two portions and applies one portion to an optical bandpass filter 34U for transmitting an USB 16U and the other portion to an optical bandpass filter 34L for transmitting an LSB 16L. With this operation, the USB 16U and LSB 16U in the spectrum shown in FIG. 2 are separated from each other.

In the optical transmission line 20, there is a group delay difference, namely a phase difference depending on chromatic dispersion between the USB 16U and the LSB 16L. That is, an amount of chromatic dispersion in the optical transmission line 20 can be measured by detecting such a phase difference.

The phase difference between the USB 16U and the LSB 16L can be detected using the following configuration. A light output from the optical bandpass filter 34U, i.e. an USB 16U, enters an electroabsorption (EA) modulator 38 through a phase adjuster 36. On the other hand, a light output from the optical bandpass filter 34L, i.e. an LSB 16L, enters a port A of an optical circulator 42 through a variable delay line 40 and then enters the EA modulator 38 through a port B of the optical circulator 42. That is to say, both of the USB 16U and the LSB 16L enter the EA modulator 38 and propagate in the EA modulator 38 in mutually opposite directions.

The EA modulator 38 functions as an AND element of the USB 16U and the LSB 16L or as an optical gate element for gating the USB 16U according to the LSB 16L using cross-absorption modulation (XAM). In other words, the EA modulator 38 calculates a correlation between the USB 16U and the LSB 16L while adjusting a phase of the LSB 16L with the variable delay line 40.

A delay time of the variable delay line 40 varies periodically according to a sawtooth wave from a sawtooth wave generator 44. The sawtooth wave generator 44 generates the sawtooth wave synchronizing with a synchronous trigger signal from a synchronous signal generator 46 as a driving signal for the variable delay line 40.

When a delay time of the variable delay line 40 is sufficient to compensate a time difference between an USB 16U and an LSB 16L corresponding to an amount of chromatic dispersion in the optical transmission line 20, the EA modulator 38 outputs the USB 16U to the port B of the optical circulator 42. Under the other condition, the EA modulator 38 absorbs the USB 16U and accordingly does not output the USB 16U to the port B of the optical circulator 42.

An USB 16U output from the EA modulator 38 is transferred from the port B to the port C of the optical circulator 42 and output from the port C. The output light from the port C of the optical circulator 42 enters a photodiode 50 through an optical bandpass filter 48 for transmitting an USB 16U and is converted into an electric signal.

Figure 3:
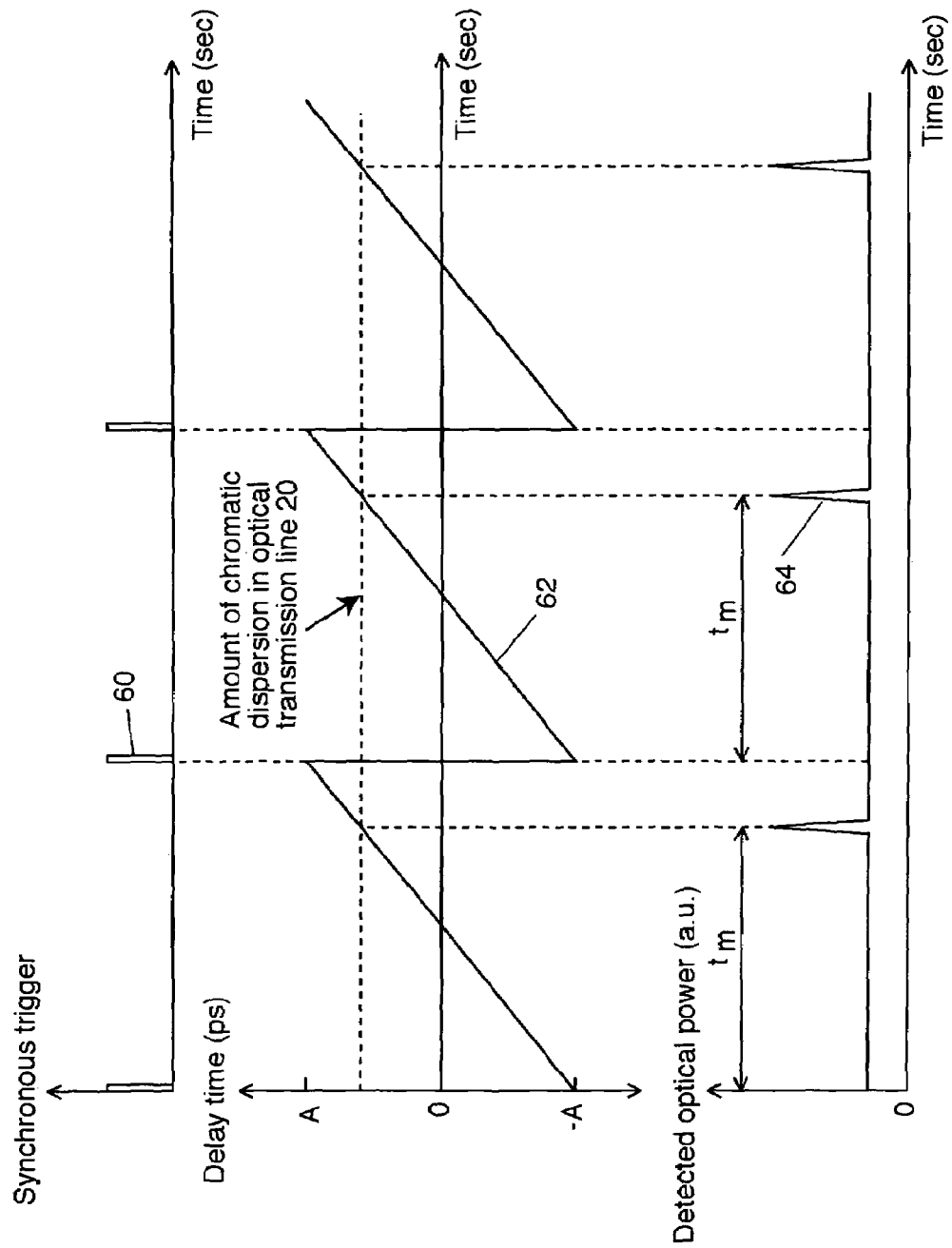
FIG. 3 shows examples of timing in the first explanatory embodiment.

FIG. 3 shows relations among a synchronous trigger 60 output from the synchronous signal generator 46, a variation 62 of a delay time of the variable delay line 40 according to a sawtooth wave from the sawtooth wave generator 44, and an output 64 from the photodiode 50. In FIG. 3, the delay time of the variable delay line 40 periodically varies from −A (ps) to +A (ps) according to a sawtooth wave from the sawtooth wave generator 44. The delay time of the variable delay line 40 is actually positive. However, in this embodiment, since the phase adjuster 36 is set to give a constant delay as a bias to an USB 16U, the variable delay line 40 can practically give a negative delay time to an LSB 16L. When an element capable of giving a negative delay is employed as the variable delay line 40, the phase adjuster 36 can be omitted.

When a delay time of the variable delay line 40 is sufficient to compensate a time difference between an USB 16U and an LSB 16L, the output 64 from the photodiode 50 becomes a high level. When the delay time of the variable delay line 40 does not meet a time difference between the USB 16U and LSB 16L caused by the chromatic dispersion in the optical transmission line 20, the output 64 becomes a noise level.

A timer 54 starts timekeeping according to asynchronous trigger 60 from the synchronous signal generator 46. A peak detector 52 applies a stop signal to the timer 54 when it detects a peak of outputs from the photodiode 52. The timer 54 measures an elapsed time tm between the synchronous trigger 60 and the stop signal (peak detection signal) from the peak detector 52. The measured time tm reflects a time difference between an USB 16U and an LSB 16L caused by the chromatic dispersion in the optical transmission line 20.

A t/σ converter 56 converts the time tm measured by the timer 54 into a chromatic dispersion value σ. For instance, the t/σ converter 56 reads an output from the timer 54 according to a synchronous trigger 60 from the synchronous signal generator 46 immediately before a next synchronous trigger enters and converts the output into a chromatic dispersion value. A time variation of a delay amount of the variable delay line 40 caused by the sawtooth wave generator 44 is known before hand. A wavelength difference between an USB 16U and an LSB 16L is also known before hand. Accordingly, the t/σ converter 56 can calculate the wavelength dispersion value σ in the optical transmission line 20 from the time tm measured by the timer 54.

In the first embodiment, an amount of chromatic dispersion can be measured through all-optical process and therefore no high-speed electric circuit is required. By extending a delay time range of the variable delay line 40, a chromatic dispersion can be measured in a wide range. Not only an absolute value of chromatic dispersion but also a polarity of the chromatic dispersion can be measured. Amplitude of a variation of delay time of the variable delay line 40 is determined according to a measurement range of chromatic dispersion. A frequency of variation of a delay time of the variable delay line 40 is determined in consideration of the stability of optical autocorrelation processes in the EA modulator 38.

In the first embodiment, although the delay time for an LSB 16L is varied one-sidedly using a sawtooth wave, it is also applicable to bidirectionally vary the delay time for an LSB 16L. By adopting this configuration, even if input/output characteristics of the variable delay line 40 have hystereses, the chromatic dispersion of the optical transmission line 20 can be accurately measured.

Figure 4:
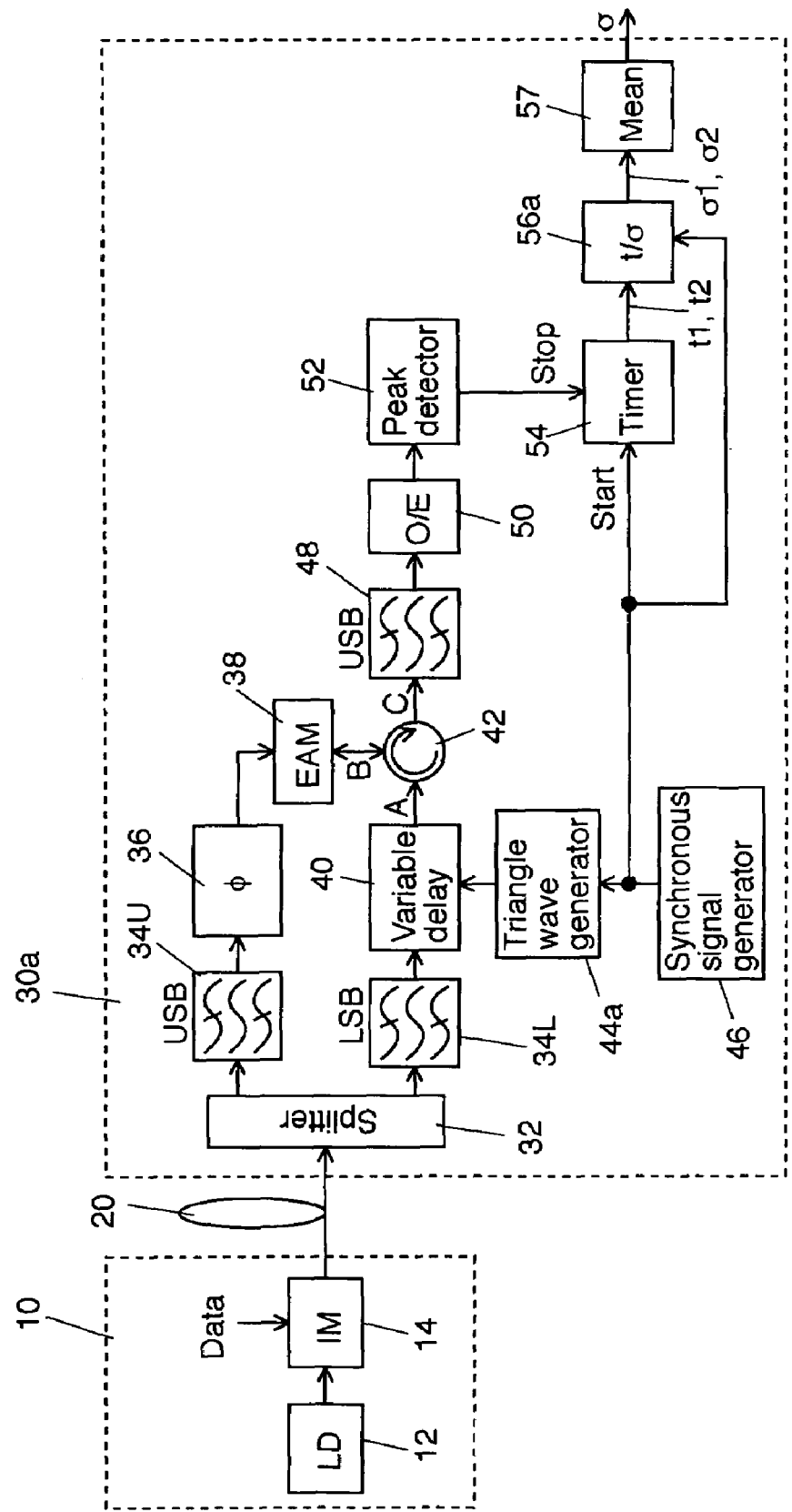
FIG. 4 is a schematic block diagram of a second explanatory embodiment according to the invention.

FIG. 4 shows a schematic block diagram of a second explanatory embodiment in which the configuration shown in FIG. 1 is modified as stated above. In FIG. 4, identical elements are labeled with the same reference numerals as those of FIG. 1. A chromatic dispersion measuring apparatus 30a measures chromatic dispersion in both increasing and decreasing directions of a delay time of the variable delay line 40 using a triangle wave generator 44a instead of the sawtooth wave generator 44. The timer 54 measures time in both increasing and decreasing directions of a delay time of the variable delay line 40, a t/σ converter 56a calculates chromatic dispersion values σ1 and σ2 based on two measured times t1 and t2, and a mean value calculator 57 calculates a mean value of the two measured values σ1 and σ2 from the t/σ converter 56a.

It is possible to dispose a timer and a t/σ converter for each of increasing and decreasing directions of a delay time of the variable delay line 40. This configuration is practically equivalent to that of FIG. 4.

Figure 5:
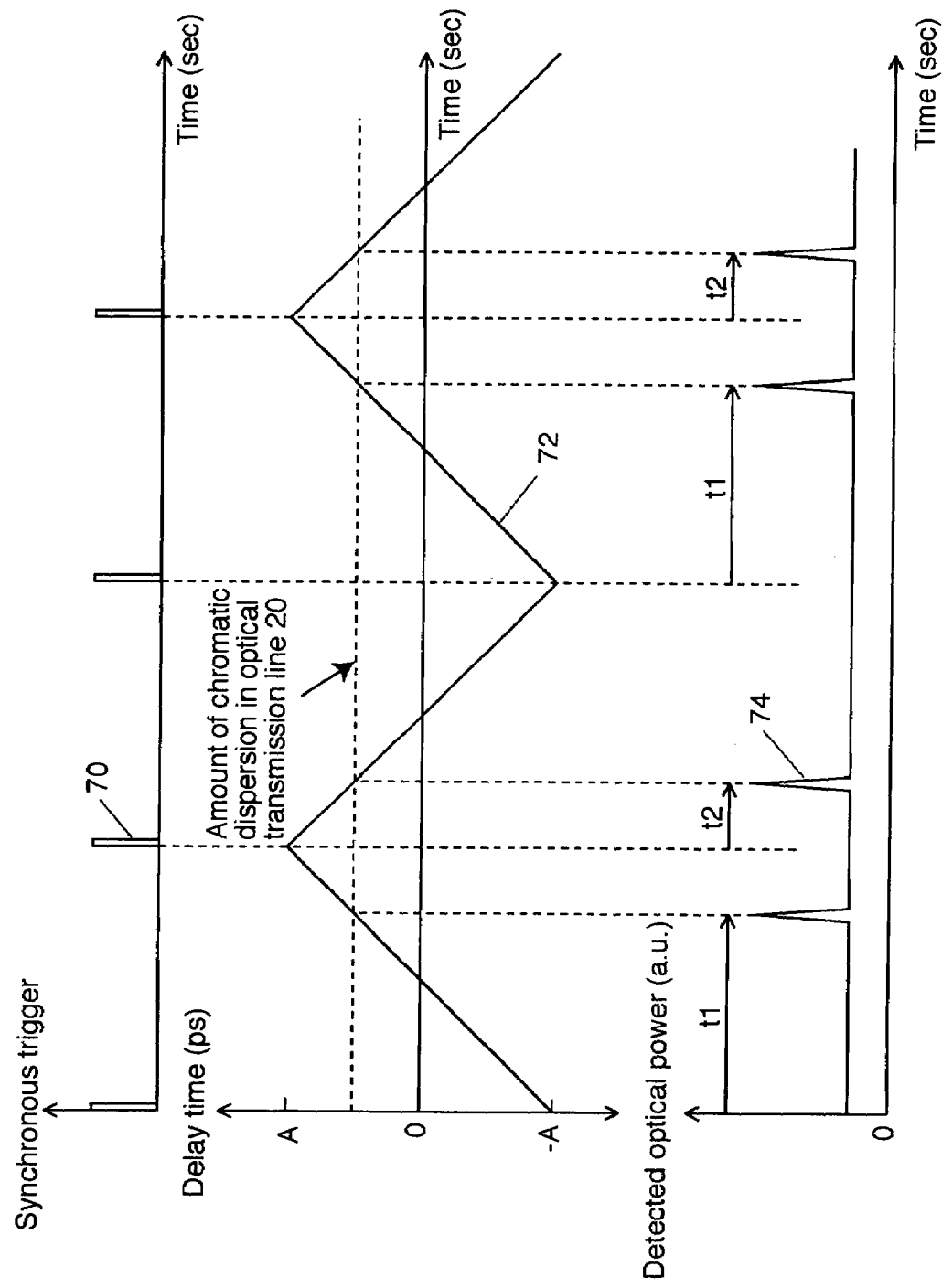
FIG. 5 shows examples of timing in the second explanatory embodiment.

FIG. 5 shows relations among a synchronous trigger 70 from the synchronous signal generator 46, a variation 72 of a delay time of the variable delay line 40 caused by a triangle wave output from the triangle wave generator 44a, and an output 74 from the photodiode 52 in the embodiment shown in FIG. 4.

The operation of the parts modified from the embodiment shown in FIG. 1 is explained below. The triangle wave generator 44a generates a triangle wave that alternately increases and decreases at equivalent rates according to the synchronous trigger 70 from the synchronous signal generator 46. The variable delay line 40 is driven by a triangle wave output from the triangle wave generator 44a. A delay time of the variable delay line 40 alternately increases and decreases at a constant cycle. As the waveform 72 of FIG. 5 shows, an inclination of the delay time variation of the variable delay line 40 is set to the same value in both increasing and decreasing directions of the delay time to make the post-process easier. In this configuration, a change from −A (ps) to +A (ps) and the reverse change in a delay time of the variable delay line 40 are alternatively repeated.

Similar to the embodiment of FIG. 1, the timer 54 starts timekeeping according to a synchronous signal as trigger 80 from the synchronous signal generator 46.

In both increasing and decreasing directions of a delay time of the variable delay line 40, the output 74 from the photodiode 50 becomes high-level when the delay time of the variable delay line 40 reaches a sufficient amount to compensate a time difference between an USB 16U and an LSB 16L caused by the chromatic dispersion in the optical transmission line 20 while the output 74 becomes noise-level when the delay time of the variable delay line 40 does not meet the time difference between the USB 16U and the LSB 16L.

When the peak detector 52 detects a peak of the output from the photodiode 50, the peak detector 52 applies a stop signal to the timer 54. The timer 54 measures elapsed times t1 and t2 between the synchronous trigger 70 from the synchronous signal generator 46 and the stop signal (peak detection signal) from the peak detector 52. A time measured in the increasing direction of the delay time is expressed as t1 and a time measured in the decreasing direction of the delay time is expressed as t2.

The t/σ converter 56a converts the times t1 and t2 measured by the timer 54 into chromatic dispersion values σ1 and σ2. For instance, the t/σ converter 56a reads an output from the timer 54 according to a synchronous trigger 70 from the synchronous signal generator 46 immediately before a next trigger enters and converts the output into a chromatic dispersion value. Since a synchronous signal 70 output from the synchronous signal generator 46 is also applied to the t/σ converter 56a, the t/σ converter 56a can judge whether the measured times t1 and t2 are in the increasing direction or the decreasing direction of the delay time according to the synchronous signal 70. Therefore, the t/σ converter 56a can accurately calculate the chromatic dispersion values σ1 and σ2. When there is no hysteresis between an input triangle wave and a delay time, the chromatic dispersion value σ1 is equal to σ2. However, when hysteresis exists between the input triangle wave and the delay time, the chromatic dispersion value σ1 differs with σ2. The mean calculator 57 calculates a mean value between the chromatic dispersion values σ1 and σ2 and outputs the mean value as a measured value σ.

As stated above, in the embodiment of FIG. 4, the delay time of the variable delay line 40 is measured in both increasing and decreasing directions of the delay time and then measured two values are averaged. Therefore, a chromatic dispersion a in the optical transmission line 20 can be measured more accurately than the embodiment shown in FIG. 1.

Although an USB and a LSB are transmitted in opposite directions in an EA modulator in the above-mentioned first and second embodiments, similar operational effects can be obtained when they are transmitted in the same direction.

Figure 6:
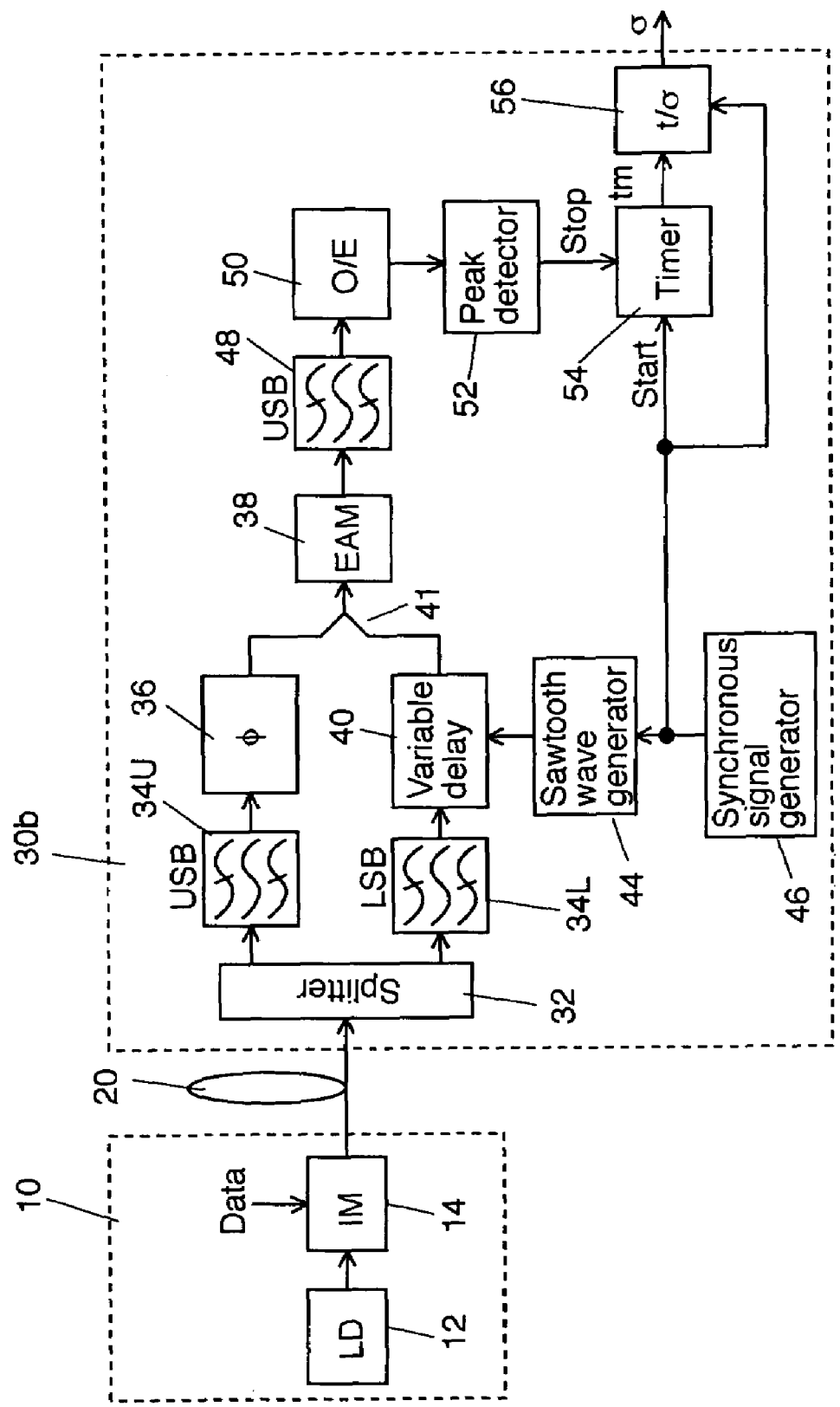
FIG. 6 is a schematic block diagram of a third explanatory embodiment according to the invention.

FIG. 6 shows a schematic block diagram of an explanatory embodiment in which the first embodiment is modified so that an USB and an LSB propagate in the same direction in an EA modulator. In a chromatic dispersion measuring apparatus 30b in the embodiment of FIG. 6, the optical circulator 42 can be omitted, but a coupler 41 for coupling an output light (USB 16U) from the phase adjuster 36 and an output light (LSB 16L) from the variable delayer 40 is necessary.

Although a correlation between an USB and an LSB is calculated in the first, second, and third embodiments, it is also applicable to calculate a correlation between a signal light from an optical transmission line and an USB or LSB.

Figure 7:
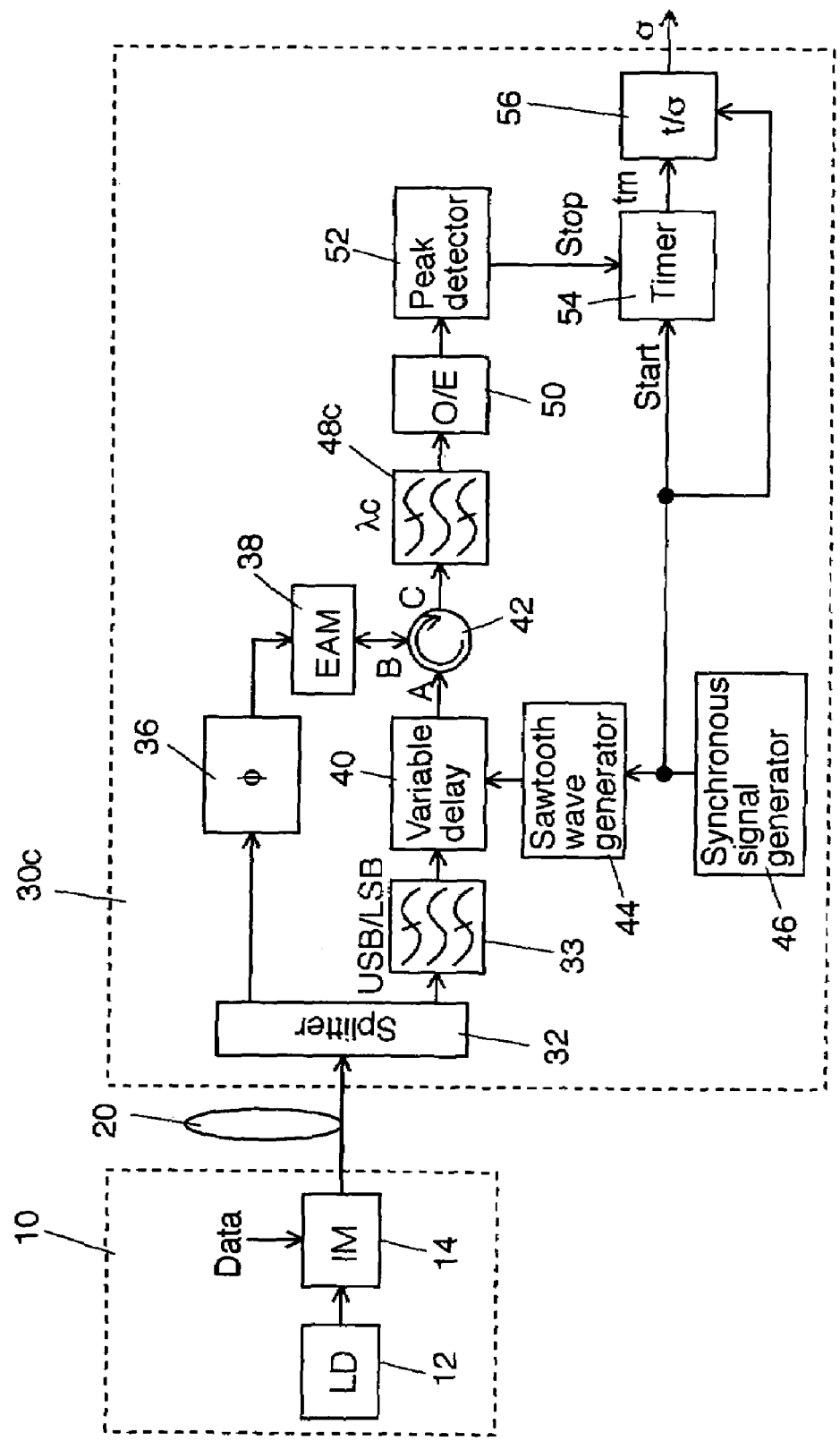
FIG. 7 is a schematic block diagram of a fourth explanatory embodiment according to the invention.

FIG. 7 shows a schematic block diagram of an explanatory embodiment in which the first embodiment is modified in such way. In FIG. 7, identical elements are labeled with reference numerals common to those of the embodiment in FIG. 1. In a chromatic dispersion measuring apparatus 30c in the embodiment of FIG. 7, one portion of two optical outputs from the splitter 32 enters the EA modulator 38 through the phase adjuster 36 while the other portion of the optical outputs from the splitter 32 enters the EA modulator 38 through the optical bandpass filter 33 for transmitting an USB or LSB, the variable delay line 40, and the optical circulator 42. The light applied to the EA modulator 38 from the phase adjuster 36 is main signal light including an optical carrier 16C, an USB 16U, and an LSB 16L.

The EA modulator 36 gates the main signal light from the phase adjuster 36 according to an USB 16U or LSB 16L from the optical circulator 42. When a delay time of the variable delay line 40 corresponds to a difference between the chromatic dispersion value at the wavelength λc of the optical carrier 16C and the chromatic dispersion value at a wavelength of the USB 16U or LSB 16L, the EA modulator 36 outputs the main signal light to the port B of the optical circulator 42. The optical circulator 42 applies the main signal light from the port B to an optical bandpass filter 48c of the center wavelength λc through the port C. Consequently, the correlation output light from the EA modulator 36 enters the photodiode 50. Since the process after those operations are the same as that of the first embodiment, the details are omitted.

It is understandable that such modification shown in FIG. 4 can be applied to the second and third embodiments.

While the invention has been described with reference to the specific embodiment, it will be apparent to those skilled in the art that various changes and modifications can be made to the specific embodiment without departing from the spirit and scope of the invention as defined in the claims.

The invention claimed is:

1. A method to measure a chromatic dispersion in an optical transmission line, the method comprising:
   generating a test signal light intensity-modulated with a test data;
   inputting the test signal light to the optical transmission line;
   extracting first and second optical components from the test signal light output from the optical transmission line, each of the first and second optical components comprising one of the group consisting of a main signal light component of the test signal light, an upper sideband component of the test signal light, and a lower sideband component of the test signal light;
   measuring a time difference between the first and second optical components; and converting the measured time difference into the chromatic dispersion value, wherein the measuring a time difference between the first and second optical components comprises delaying the second optical component and calculating a correlation between the first optical component and the delayed second optical component while varying a phase difference between the first and second optical components.

2. The method of claim 1 wherein the measuring a time difference between the first and second optical components comprises varying the phase difference between the first and second optical components in a sawtooth waveform.

3. The method of claim 1 wherein the measuring a time difference between the first and second optical components is performed in each of increasing and decreasing directions of the phase difference between the first and second optical components while varying the phase difference between the first and second optical components in a triangle waveform.

4. The method of claim 1 wherein the measuring a time difference between the first and second optical components comprises:
   giving a constant delay to one portion of the first and second optical components;
   giving a variable delay to another portion of the first and second optical components;
   calculating a correlation between the first and second optical components delayed respectively with the constant delay and the variable delay; and
   detecting a delay time at the giving of the variable delay that brings a maximum correlation in the correlations that can be calculated by the calculating of the correlation.

5. The method of claim 4 wherein the variable delay time at the giving of the variable delay varies in a sawtooth waveform.

6. The method of claim 4 wherein the delay time at the giving of the variable delay varies in a triangle waveform and the detecting of the delay time at the giving of the variable delay that brings the maximum correlation in the correlations that can be calculated by the calculating of the correlation is performed in each of increasing and decreasing directions of the delay time.

7. The method of any one of claims 1 to 4 wherein the first optical component comprises one portion of the upper and lower sideband components of the test signal light and the second optical component comprises another portion of the upper and lower sideband components of the test signal light.

8. The method of any one of claims 1 to 4 wherein the first optical component comprises the main signal light component of the test signal light and the second optical component comprises one of the upper and lower sideband components of the test signal light.

9. A chromatic dispersion measuring apparatus for measuring a chromatic dispersion in an optical transmission line, the apparatus comprising:
   an extractor to extract first and second optical components from a test signal light output from the optical transmission line, each of the first and second optical components comprising one of the group consisting of a main signal light component of the test signal light, an upper sideband component of the test signal light, and a lower sideband component of the test signal light;
   a time difference measuring apparatus to measure a time difference between the first and second optical components; and
   a converter to convert the measured time difference into the chromatic dispersion value, wherein the time difference measuring apparatus comprises:
   a constant delay device to give a constant delay to one portion of the first and second optical components;
   a variable delay device to give a variable delay to another portion of the first and second optical components;
   an optical correlator to calculate a correlation between the first and second optical components delayed respectively by the constant delay device and the variable delay device; and
   a delay detector to detect a delay time of the variable delay device that brings a maximum correlation in the correlations that is calculated by the optical correlator.

10. The apparatus of claim 9 wherein the optical correlator comprises an electroabsorption optical modulator, an optical circulator, and an optical filter to extract one portion of wavelength components of the first and second optical components; and
    wherein one portion of optical outputs from the constant delay device and the variable delay device directly enters the electroabsorption optical modulator while another portion of the outputs from the constant delay device and the variable delay device enters the electroabsorption optical modulator via the optical circulator.

11. The apparatus of claim 9 wherein the optical correlator comprises:
    an electroabsorption optical modulator to which optical outputs from the constant delay device and the variable delay device enter; and
    an optical filter to extract one wavelength components of the first and second optical components from an output from the electroabsorption optical modulator.

12. The apparatus of claim 9 wherein the delay detector comprises:
    a photoelectric converter to convert a correlation signal light output from the optical correlator into an electric signal;
    a peak detector to detect a peak of the electric signal from the photoelectric converter; and
    a timer to start timekeeping synchronizing with a variation of a delay time of the variable delay device and to stop timekeeping according to peak detection of the peak detector.

13. The apparatus of claim 9 wherein the variable delay device comprises a variable delay line driven by a sawtooth waveform.

14. The apparatus of claim 9 wherein the variable delay device comprises a variable delay line driven by a triangle wave and the delay detector detects a delay time of the variable delay line that brings the maximum correlation in the correlations that can be calculated by the optical correlator in each of increasing and decreasing directions of the delay time of the variable delay line.

15. The apparatus of any one of claims 9 to 14 wherein the first optical component comprises one portion of the upper and lower sideband components of the test signal light and the second optical component comprises another portion of the upper and lower sideband components of the test signal light.

16. The apparatus of any one of claims 9 to 14 wherein the first optical component comprises the main signal light component of the test signal light and the second optical component comprises one portion of the upper or one portion of the lower sideband components of the test signal light.

* * * * *